United States Patent
Antao (10) Patent No.: US 9,747,295 B1
(45) Date of Patent: Aug. 29, 2017

(54) UPDATING A LARGE DATASET IN AN ENTERPRISE COMPUTER SYSTEM

(71) Applicant: Sprint Communications Company L.P., Overland Park, KS (US)

(72) Inventor: Jawahar Antao, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 277 days.

(21) Appl. No.: 14/531,959

(22) Filed: Nov. 3, 2014

(51) Int. Cl.
*G06F 17/30* (2006.01)

(52) U.S. Cl.
CPC .. *G06F 17/30117* (2013.01); *G06F 17/30345* (2013.01); *G06F 17/30486* (2013.01); *G06F 17/30489* (2013.01)

(58) Field of Classification Search
CPC ......... G06F 17/30303; G06F 17/30581; G06F 17/30495; G06F 17/30575; G06F 17/30306; G06F 17/30345; G06F 17/30578; G06F 17/30348
USPC ........ 707/613, 611, 748, 691, 626, 610, 703
See application file for complete search history.

(56) References Cited

U.S. PATENT DOCUMENTS

| | | | | |
|---|---|---|---|---|
| 6,061,503 A | * | 5/2000 | Chamberlain | H04N 21/4332 707/999.006 |
| 6,167,549 A | * | 12/2000 | Lin | G06F 11/1068 714/763 |
| 6,401,104 B1 | * | 6/2002 | LaRue | G06F 17/30578 |
| 6,449,622 B1 | * | 9/2002 | LaRue | G06F 17/30575 |
| 6,460,051 B1 | * | 10/2002 | LaRue | G06F 17/30575 |
| 6,606,618 B2 | * | 8/2003 | Delo | G06F 8/61 |
| 6,810,405 B1 | * | 10/2004 | LaRue | A61M 19/00 707/613 |
| 7,013,313 B1 | * | 3/2006 | LaRue | G06F 17/30575 |
| 7,243,096 B2 | * | 7/2007 | Aureglia | G06F 17/246 707/748 |
| 7,318,059 B2 | * | 1/2008 | Thomas | G06Q 10/10 |
| 7,962,457 B2 | * | 6/2011 | Deffler | G06F 17/30368 707/703 |
| 7,979,324 B2 | * | 7/2011 | Vadlamani | G06Q 30/0601 705/27.1 |
| 7,991,737 B2 | * | 8/2011 | Nielsen | G06F 17/30306 707/613 |

(Continued)

FOREIGN PATENT DOCUMENTS

| | | | | |
|---|---|---|---|---|
| GB | 2341250 A | * | 3/2000 | ....... G06F 17/30303 |
| WO | WO 0190933 A1 | * | 11/2001 | ....... G06F 17/30581 |

*Primary Examiner* — Frantz Coby (57) ABSTRACT

A method of updating fields of records in a dataset mediated by a database management tool (DMT) that does not an API function for updating individual fields of records. The method comprises adding a temporary field to each record in a dataset by the DMT, copying a subset of the records in the dataset by an application that is not the DMT, changing at least one field in each of the copied subset of records by the application, changing the temporary field of the copied subset of records by the application. The method further comprises adding the subset of records to the dataset by the DMT, aggregating, by the DMT, the dataset based on a selection criterion defined with reference to the temporary field, wherein aggregating removes conflicts between records that have the same unique identifier based on the temporary field values of the conflicting records.

15 Claims, 5 Drawing Sheets

(56) References Cited

U.S. PATENT DOCUMENTS

| | | | |
|---|---|---|---|
| 8,103,633 B2* | 1/2012 | Stier | G06F 17/30607 707/634 |
| 8,131,759 B2* | 3/2012 | Salcedo | G06F 17/30575 707/610 |
| 8,352,444 B1* | 1/2013 | Chang | G06F 12/1408 707/693 |
| 8,423,564 B1* | 4/2013 | Hayes | G06F 17/30345 707/611 |
| 8,645,332 B1* | 2/2014 | Cohen | G06F 17/30348 707/691 |
| 8,700,569 B1* | 4/2014 | Wilson | G06F 17/303 707/626 |
| 8,965,923 B1* | 2/2015 | Salcedo | G06F 17/30495 707/610 |
| 2006/0020594 A1* | 1/2006 | Garg | G06F 17/30575 |
| 2008/0120479 A1* | 5/2008 | Dick | G06F 8/00 711/154 |
| 2008/0163170 A1* | 7/2008 | Stier | G06F 17/30607 717/120 |
| 2010/0057742 A1* | 3/2010 | Hardy-McGee | G06Q 10/0637 705/30 |
| 2011/0082890 A1* | 4/2011 | Banister | G06F 17/30563 707/792 |
| 2015/0039623 A1* | 2/2015 | Pandit | G06F 17/30557 707/740 |

* cited by examiner

UPDATING A LARGE DATASET IN AN ENTERPRISE COMPUTER SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A dataset can comprise a large number of records, each of the records comprising a number of fields. When working with large datasets, it can sometimes be necessary to often update records.

SUMMARY

In an embodiment, a method for creating, by an application executing on a computer, an updated dataset from an existing dataset, the existing dataset comprising a plurality of existing records, each existing record comprising a plurality of fields, at least one field in the plurality of fields being a unique identifier field, the unique identifier field comprising a unique identifier and wherein the dataset comprises records of user interactions with mobile communication devices, is disclosed. The method comprises adding, by a database management tool executing on a computer, a temporary field to each existing record in a dataset by adding a new column, the temporary field containing a first value defined as a default value for the new column, wherein the database management tool does not provide an application programming interface (API) function for updating individual fields of records and wherein the database management tool supports fast access to records in a targeted advertising system. The method further comprises copying a subset of the records in the dataset, by an application executing on a computer, changing, by the application, at least one individual field in each of the copied subset of records to update the records, and changing, by the application, the temporary field to a second value different from the first value in the copied subset of records. The method further comprises adding, by the database management tool, the subset of records to the dataset, aggregating, by the database management tool, the dataset based on a selection criterion defined with reference to the temporary field, wherein aggregating comprises identifying conflicts that comprise records that have the same unique identifier, identifying a preferred record for each conflict based on the criterion and based on the temporary field values of the conflicting records, and deleting records for each conflict that are not preferred, and deleting, by the database management tool, the temporary field from the records in the dataset, thereby creating an updated dataset.

In another embodiment, a method for creating, by the application executing on the computer, a series of partitions of a dataset, the dataset comprising an existing partition, the existing partition comprising a plurality of existing records, each existing record comprising a plurality of fields, at least one field in the plurality of fields being a unique identifier field, the unique identifier field comprising a unique identifier, and a temporal field storing a temporal value is disclosed. The method comprises adding, by a database management tool executing on a computer, a temporary field to each existing record in a dataset by adding a new column, the temporary field containing a first value defined as a default value for the new column, wherein the database management tool does not provide an application programming interface (API) function for updating individual fields of records and copying a subset of the records in the dataset, by an application executing on a computer. The method further comprises changing, by the application, at least one individual field in each of the copied subset of records to update the records and changing, by the application, the temporary field to a second value different from the first value in the copied subset of records. The method further comprises adding, by the database management tool, the subset of records to the dataset and aggregating, by the database management tool, the dataset based on a selection criterion defined with reference to the temporary field, wherein the aggregating creates a new partition comprising the aggregated records, wherein the aggregating comprises identifying conflicts that comprise records that have the same unique identifier, identifying a preferred record for each conflict based on the criterion and based on the temporary field values of the conflicting records, and deleting records for each conflict that are not preferred. The method further comprises deleting, by the database management tool, the temporary field from the records in the dataset, thereby creating an updated dataset, and repeating the previous steps periodically to create additional partitions, the step of repeating using updated records that have been created since the previous partition was created.

In another embodiment, a method for creating, by the application executing on the computer, an updated dataset from an existing dataset, the existing dataset comprising a plurality of existing records, each existing record comprising a plurality of fields, at least one field in the plurality of fields being a unique identifier field, and one field in the plurality of fields being a temporal field, the unique identifier field comprising a unique identifier is disclosed. The method comprises copying a subset of the records in the dataset, by a database management tool executing on a computer, changing, by an application executing on a computer, at least one individual field in each of the copied subset of records to update the records, changing, by the application, the temporal field to a value of the current date and different from the initial value in the copied subset of records, and adding, by the database management tool, the subset of records to the dataset. The method further comprises aggregating, by the database management tool, the dataset based on a selection criterion defined with reference to the temporal field that prefers conflicting records having a value of a later date value, wherein aggregating comprises identifying conflicts that comprise records that have the same unique identifier, identifying a preferred record for each conflict based on the criterion and based on the temporal field values of the conflicting records, and deleting records for each conflict that are not preferred, thereby creating an updated dataset.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the modern era of "Big Data", it is not uncommon to encounter databases or datasets that have billions of records. Many products have been created to manipulate these massive databases. One example of such a product is a database management tool named Apache Hive, an open source product that is used for analyzing large data stores. Database management tools may provide specific methods for accessing the data in the database the tool encapsulates. It may be useful to think of the relationship between a database management tool and the associated database as a black box (representing the database management tool) with the data base inside and a limited set of interactions provided on a front panel of the black box for accessing and manipulating the data. The user cannot directly access the data in the database but can only interact with it through the application programming interface (API) provided by the database management tool.

Some database management tools do not provide API methods to make changes directly to individual fields within individual records of the subject database (for example, Apache Hive). Formerly, to update individual fields within individual records, all of the records in the database would be exported from a first database management tool to a second database management tool that does support field updates to rows. The desired field updates would be performed using the second database management tool. Then all of the records would be copied back into the database maintained by the first database management tool. This is a cumbersome, slow, and inefficient process.

It begs the question, why not use the second database management tool and not use the first database management tool? The first database management tool is preferred to the second database management tool for using the database because it is very good at computing in huge datasets: very good at aggregating data and running reports. To address this issue, the present disclosure teaches a method that allows updating of fields within records indirectly using other API methods supported by the database management tool. In some contexts, this may be referred to as a workaround. The method taught herein provides an improvement to the functioning of the computer system and/or to the functioning of the database system.

A dataset for updating may be selected. The dataset may be the actual database, or it may be a partition, a generated subset of the original database. The dataset comprises a number of fields, including one field that is for a unique identifier. In a steady state of the dataset, the unique identifier is different for every single record. It may be that two or more different records may have the same "unique" identifier for a transient period of time, until this conflict is reconciled, for example by performing an aggregation function via the API of the database management tool. The unique identifier may be created by the owner of the database.

To begin the updating process, first a new temporary field may be added to all the existing records of the dataset. This is done by adding a column to the dataset, using an API provided by the database management tool, with a default value specified when adding the column (e.g., an automated script that executes on a computer invokes a column add function provided by the API of the database management tool that executes on the same or a different computer, and that function adds the column with the default value to the dataset). The default value assigned to the new temporary field may be referred to as a first value or a first content. This first value may be something as simple as yesterday's date, or a number, a letter, etc.

Then a set of copied records is created using an API of the database management tool (e.g., the automated script invokes a copy function provided by the API of the database management tool, and that copy function copies the set of copied records). This set of records is selected as those records that are known to have changes pending in one or more fields. For example, a separately generated digest of changes pending in the database may be generated by a separate process, for example an enterprise application executing on a computer. This set of copied records normally may be a small subset of the complete dataset, for example 100,000 records out of 1 billion records. These copied records are then automatically edited, for example by executing the automated script, to revise the fields of the records that have changes pending. Note that the other fields of the copied records remain unchanged. Also note that the copied records have the same unique identifier as the unchanged records in the dataset that they are associated with. The copied records initially will have the same temporary field as the existing records in the dataset, but a second content or value is assigned to the temporary field that is different from the value in the temporary field in the full dataset (that value may be referred to in some contexts as an initial value of the temporary field). This different value can be used to distinguish between unchanged records and changed records. Today's date, or a different letter or number, etc., may be assigned to the temporary field in the copied records.

These copied records are then inserted into the larger dataset (e.g., the automated script invokes an insert function provided by the API of the database management tool, and the insert function inserts the copied records into the larger dataset), and an aggregation process is performed by the database management tool on the database. The aggregation process resolves conflicts between different records that have the same unique identifier (there can only be one record having a unique identifier, or the identifier does not uniquely identify records) and discards one of the conflicting rows based on a preference rule or preference criterion. For example, the selection rule may prefer a record having a later date in the temporary field or a higher number (e.g., a kind of version number or revision number) in the temporary field. Thereby, the older version of the record will be deleted from the dataset, and a new dataset is created incorporating the updated records. This method provides an efficient way to update fields of individual records in a database mediated by a database management tool that does not provide API support for direct field update of records, as for example Apache Hive.

This process can be repeated as often as necessary. Indeed, it may be preferable to repeat the process at regular time intervals, such as daily or weekly. Further, each created partition may be saved separately over time, so that several historical partitions are saved for as long as desired. Such saved partitions may also be deleted once they reach a certain age. In an embodiment, updates are generated by enterprise applications and are provided to the automated script on a periodic basis, for example once per day.

In an alternative embodiment, the temporary field may in fact be a permanent field meant to serve the purpose of marking temporally which are the existing records and which are the updated records. That is, the field serves as a temporal field. When using such a system, the method is similar, in that the first value or first content is inserted into the temporal field of the existing records, the second value or second content is inserted into the temporal field of the updated records, the records merged and then aggregated by the database management tool so that the older duplicate records are removed, with the updated records replacing them. Said in other words, the preference rule or preference criterion may specify that the latest date in the temporal field of conflicting records be preferred and conflicting records with an earlier date are discarded.

As with the process using temporary fields, the process using the temporal field may be repeated as often as desired. It may be necessary to reset the content of the current existing records' temporal fields to all be the same, prior to undertaking the merging and aggregation with the new updated records, which will have a value in their temporal fields that is different from what is in the existing records. Also as with the earlier version of the process, as each partition is created it may be saved separately after it has been replaced as the active dataset, so that a number of partitions may be saved for later study, and then deleted, if and when desired. However, if dates of updating are used consistently, whatever is in the remaining records after aggregation can be left there for future iterations of the method, as the method will only delete records that are duplicated and older.

The teachings of the present disclosure may be applicable to a variety of large databases and/or data stores. As an example, a data store that comprises data about subscribers of a mobile communication company may be stored in such a data store. The records may be referred to as profiles in some contexts. The records may comprise information on purchasing histories of subscribers, demographic information about the subscribers, and ad interaction histories. The records may comprise information about user interactions with mobile communication devices, for example clicks on links embedded in web pages, on-line purchases, launchings of mobile applications, control selections within mobile applications, and the like. This data store may be accessed rapidly to make decisions on targeting ads to a sub-set of the full community of subscribers, for example those in a preferred demographic for buying potato chips or for buying luxury cars.

Figure 1:
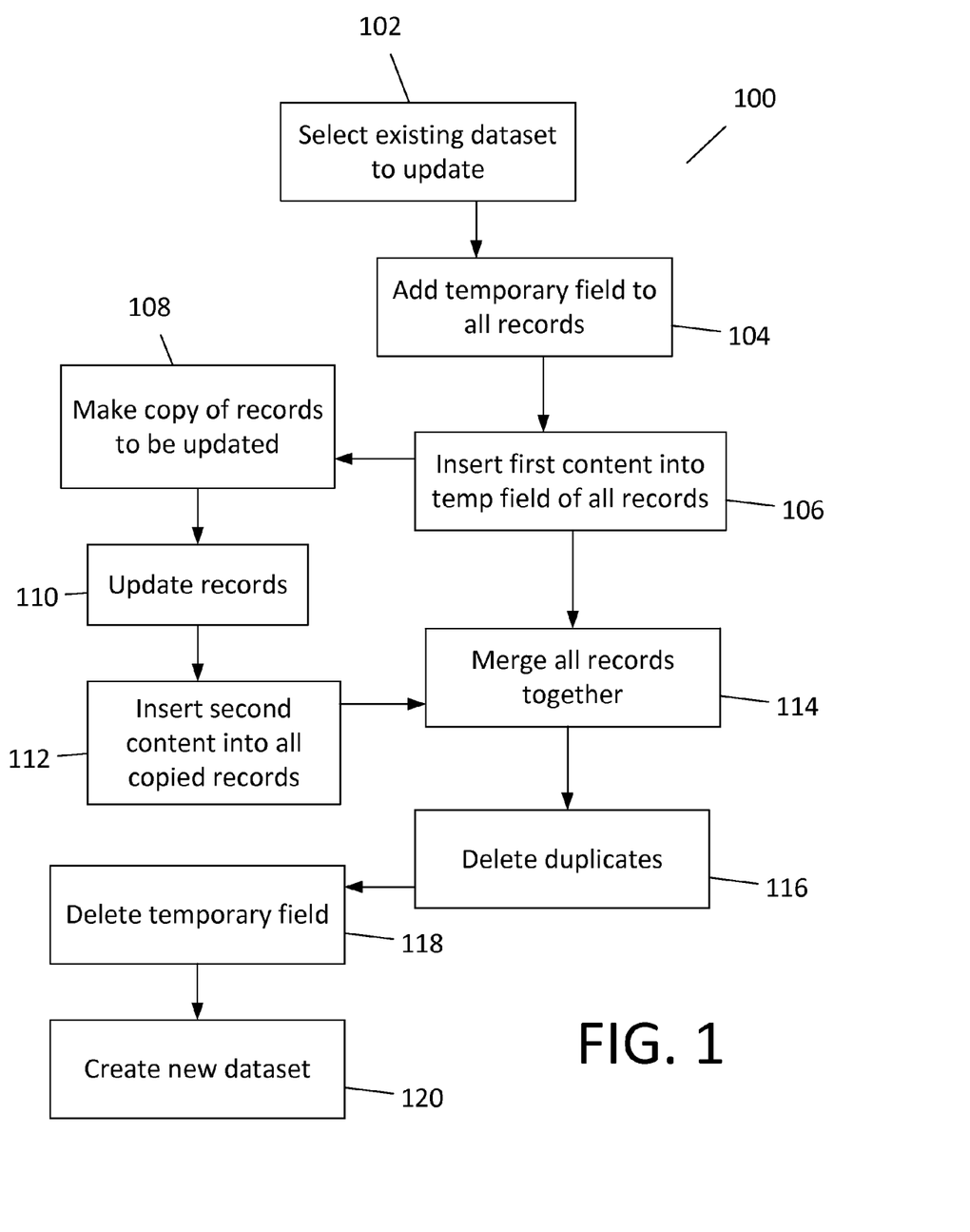
- FIG. 1 is a flow chart of a method according to an embodiment of the disclosure.

Referring now to FIG. 1, a flow chart of a method 100 is shown. It is understood that the method 100 may be performed by one or more computers. Computers are discussed further hereinafter. An existing dataset for updating may be selected 102. The dataset may be the actual database, or it may be a partition, a generated subset of the original database. The dataset comprises a number of fields, including one field that is for a unique identifier. In a steady state of the database, the unique identifier is different for every single record. The unique identifier may be created by the owner of the database.

To begin the updating process, a temporary field is added to all the existing records of the dataset 104 by invoking a function provided by an API of a database management tool, for example by a script executing on a computer that invokes the API of the database management tool that executes on a different computer. The script computer may communicate with the database management tool computer via a communication network. The temporary field may be added by defining a new column and a default value for the new column. This may be a very fast way to add a new field to millions or billions of records in a large data store. This first content may be something as simple as yesterday's date, or a number, a letter, etc. In a preferred embodiment, the first content would be yesterday's date. Then a set of duplicate records are created 108. As an example, in a database with one billion records, there may be one hundred thousand updates created in a single day that have to be added into the appropriate records. These duplicate records are only the records that are to be updated, and not all the records. These records are then updated 110 outside of the database management tool, for example using a script executing on a computer that is different from the computer that executes the database management tool. Then a second content is inserted into the temporary field of each updated record 112. This second content may be something as simple as today's date, or a number, a letter, etc. In a preferred embodiment, the second content would be today's date. These updated records are now ready for merging back into the existing dataset using an API function provided by the database management tool. The steps of updating and adding the second content could also be performed with the updating 110 occurring after the inserting of the second content 112.

These updated records are now ready to be merged back into the existing records in the dataset 114, creating a new totality of records. The database management tool is then used to aggregate all the records together. As part of the aggregation process, the database management tool will be used to remove duplicate records 116 in which (1) the unique identifier is the same, and (2) the content of the temporary field does not satisfy the selection criterion or selection rule (for example, the selection rule may be the temporary field having the latest date is preferred). Thereby, the older version of the updated records will be deleted from the dataset.

Now that all the records are updated, the temporary field is now deleted 118. This may be accomplished by invoking an API function of the database management tool to remove the subject column. Thereby, a new dataset has been created 120 with all updates added in. The process may be repeated as often as is desired. For example, the process may be repeated once or twice a day. Note that this update was accomplished without touching all the records in the database or dataset but only working on the relatively small fraction of records associated with changes.

Figure 2:
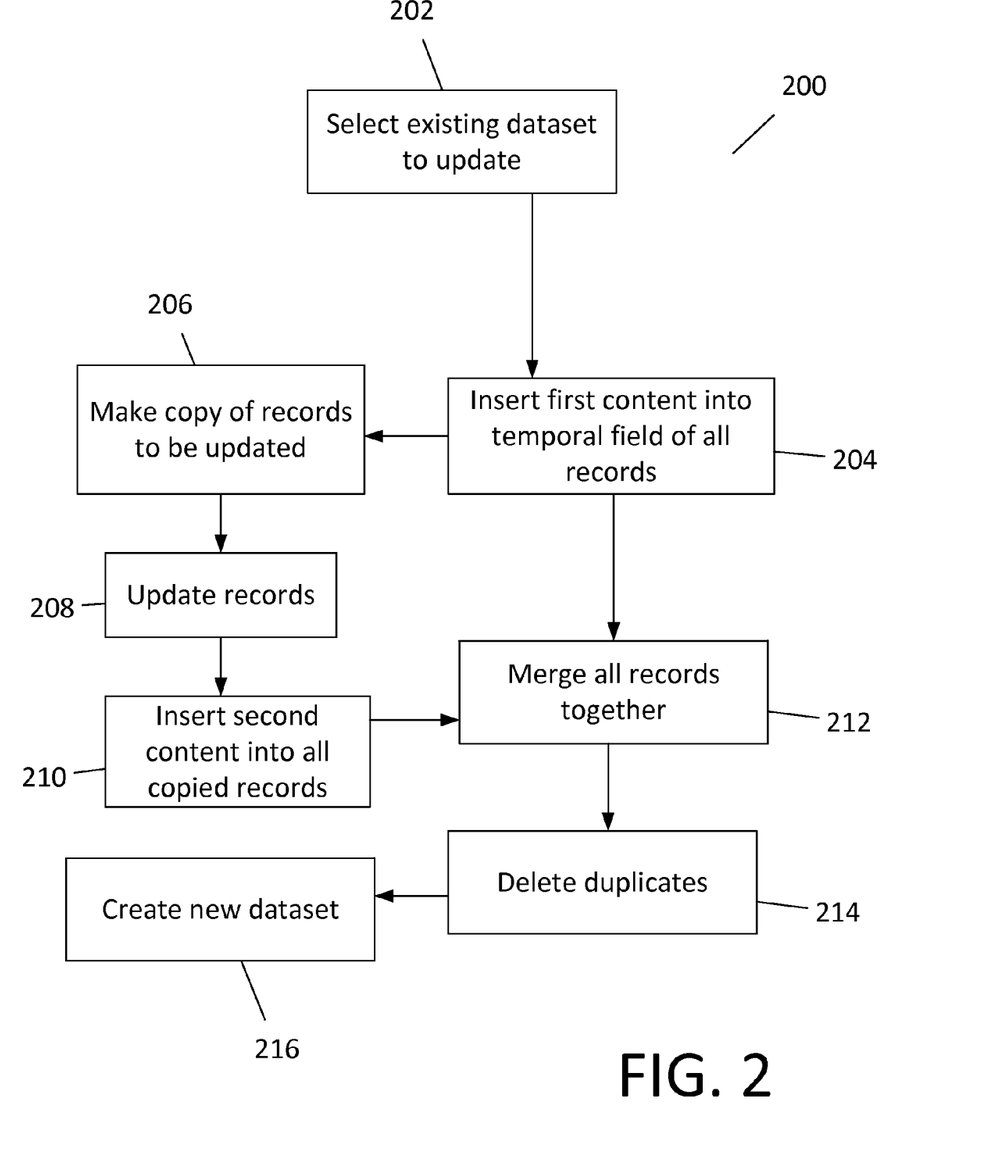
FIG. 2 is a flow chart of another method according to an embodiment of the disclosure.

Referring now to FIG. 2, a flowchart of a method 200 is described. It is understood that the method 200 may be performed by one or more computers. An existing dataset for updating may be selected 202. The dataset may be the actual database, or it may be a partition, a generated subset of the original database. The dataset comprises a number of fields, including one field that is for a unique identifier. In the steady state of the database, the unique identifier is different for every single record. The unique identifier may be created by the owner of the database. In this embodiment, each record also has a field here called "temporal", as it is used to aggregate conflicting records, and hence will serve a similar purpose as the temporary field described with reference to FIG. 1. But in this embodiment, the temporal field is not added and deleted from all the records each time the process is run. Instead, the temporal field is allowed to remain in all records with the creation of each new dataset, with only the contents manipulated via the aggregation function provided by the API of the database management tool.

At block 204, the new temporal field is inserted into all the records in the database with a value that may be referred to as a first content. The temporal field may be inserted by adding a column to the database using the API of the database management tool. This first content may be something as simple as yesterday's date, or a number, a letter, etc. In a preferred embodiment, the first content would be yesterday's date. Then a set of duplicate records are created 206 from the records in the database. As an example, in a database with one billion records, there may be one hundred thousand updates created in a single day that are to be added into the appropriate records. These duplicate records are only the records that are to be updated, and not all the records. These records are then updated 208. For example, the fields that have pending changes are written with changed values using a different tool, for example a script that executes on a computer, where the script is different from the database management tool. Then a second content is inserted into the temporal field of each updated record 210. This second content may be something as simple today's date, or a number, a letter, etc. In a preferred embodiment, the second content would be today's date. These changed records are now ready for merging back into the existing dataset. The steps of updating and adding the second content could also be performed with the updating 208 occurring after the inserting of the second content 210.

These changed records are now ready to be merged back into the existing records in the dataset 212, creating a new totality of records. The database management tool is then used to aggregate all the records together. As part of the aggregation process, the database management tool automatically removes conflicting records 214 in which (1) the unique identifier is the same, and (2) the content of the temporal field does not satisfy a selection criterion. For example, the criterion may prefer to retain the record with a later date in the temporal field and delete the record with an earlier date in the temporal field. Thereby, the older version of the conflicting records will be deleted from the dataset by the database management tool. Thereby, a new dataset has been created 216 with all updates added in. The process may be repeated as often as is desired. For example, the process may be repeated once or twice a day.

When this new dataset is to be updated, the current contents of the temporal field may be left as it is, to now serve as a new first content, or it may be replaced with something else. As is apparent, when updates are made once a day, having today's date as the second content in effect creates a notice in each record as to when it was last updated. When a new update is to be made, there is no need to change the existing content of the temporal field in the existing dataset, as it will be an older date already. The new date will be placed in the temporal field of the updated records. Other versions of this concept may be utilized, such as using a date stamp that include hours and minutes, so multiple updates a day are possible.

Figure 3:
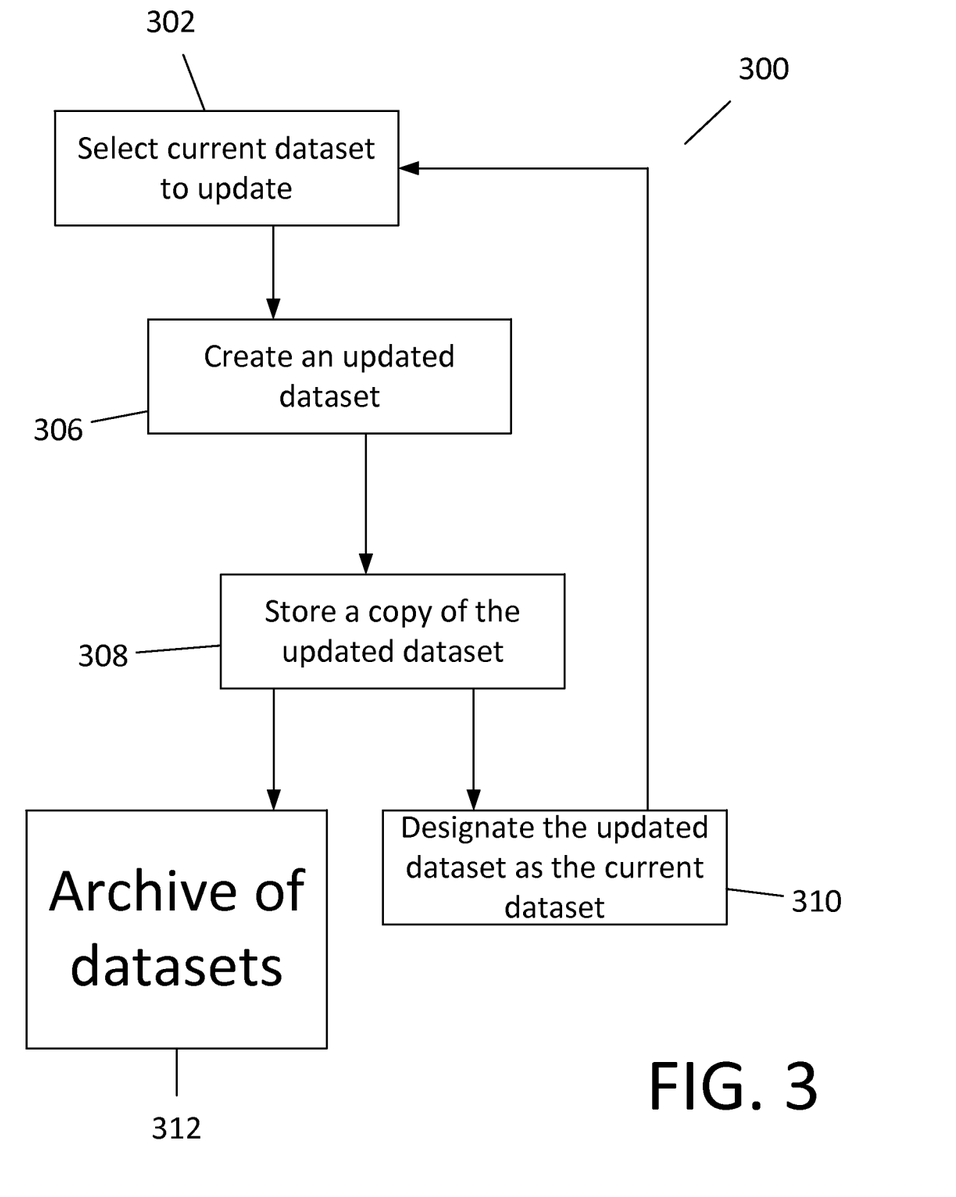
FIG. 3 is a flow chart of yet another method according to an embodiment of the disclosure.

Referring now to FIG. 3, a flowchart of a method 300 is described. One of the advantages of this process is that a series of partitions may be created and saved over time. A partition is a subset of a complete database. Though the methods above could be used to alter the original database itself. One of the advantages of using partitions is that if some erroneous or damaging content gets into the records, one can easily go back to an earlier date before that change occurred and redo the updates, without the troublesome content. In the methods discussed in FIGS. 1 and 2, the datasets may be partitions.

In this FIG. 3, a current dataset is selected 302. An updated dataset is created 306, using the methods as taught above. Then, a copy of the new updated dataset is stored 308 to an archive of datasets 312. Thereby, a historical record can be retained of all the changes that have been made in the various partitions or to the original database itself over time. The new updated dataset is then redesignated as the "current" dataset 310, ready for use the next time the method is run.

The creation of multiple partitions of a particularly large database may suggest that the extra steps of first adding and then later deleting the temporary field are worth the extra run time, as thereby the records will be slightly smaller, and hence each partition will take up less memory for storage. Though perhaps run time is more of a concern than memory storage, in which case the method taught in FIG. 2 may be preferable.

This process can be repeated as often as necessary. Indeed, it may be preferable to repeat the process at regular time intervals, such as daily or weekly. Such saved partitions may also be deleted once they reach a certain age.

Figure 4:
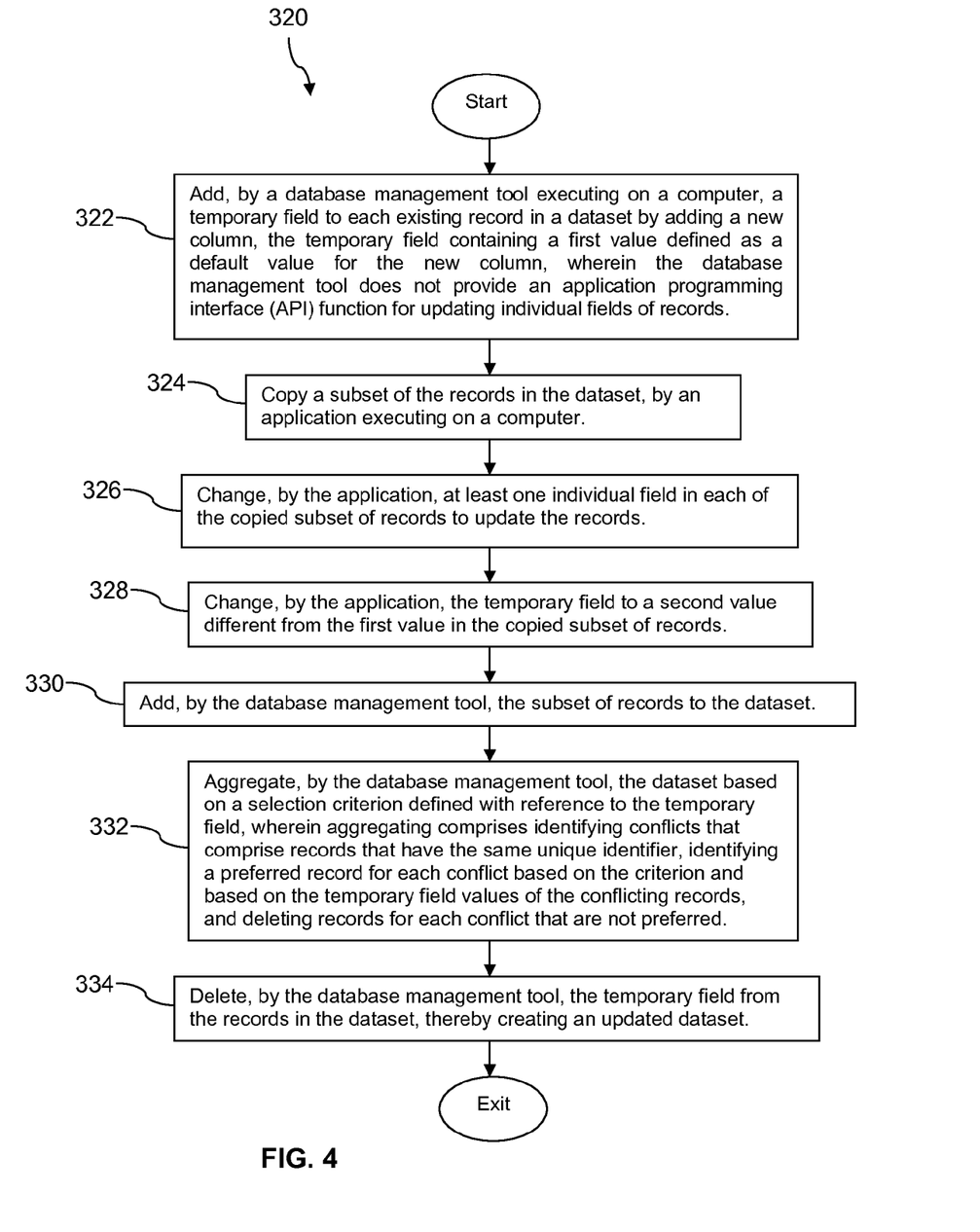
FIG. 4 is a flow chart of still another method according to an embodiment of the disclosure.

FIG. 4 is a flowchart of a method 320. At block 322, add, by a database management tool executing on a computer, a temporary field to each existing record in a dataset by adding a new column, the temporary field containing a first value defined as a default value for the new column, wherein the database management tool does not provide an application programming interface (API) function for updating individual fields of records. At block 324, copy a subset of the records in the dataset, by an application executing on a computer. The application may be an automated script that executes on a computer, on the same computer as the database management tool or a different computer. At block 326, change, by the application, at least one individual field in each of the copied subset of records to update the records. At block 328, change, by the application, the temporary field to a second value different from the first value in the copied subset of records.

At block 330, add, by the database management tool, the subset of records to the dataset. At block 332, aggregate, by the database management tool, the dataset based on a selection criterion defined with reference to the temporary field, wherein aggregating comprises identifying conflicts that comprise records that have the same unique identifier, identifying a preferred record for each conflict based on the criterion and based on the temporary field values of the conflicting records, and deleting records for each conflict that are not preferred. At block 334, delete, by the database management tool, the temporary field from the records in the dataset, thereby creating an updated dataset. In an embodiment, the method may further comprise periodically repeating these steps, for example as new updates are received from another system, such as an enterprise application. In an embodiment, updates may be received about daily, and the steps 322-334 may be repeated daily. In another embodiment, however, the updates may be performed at some different periodic rate.

Figure 5:
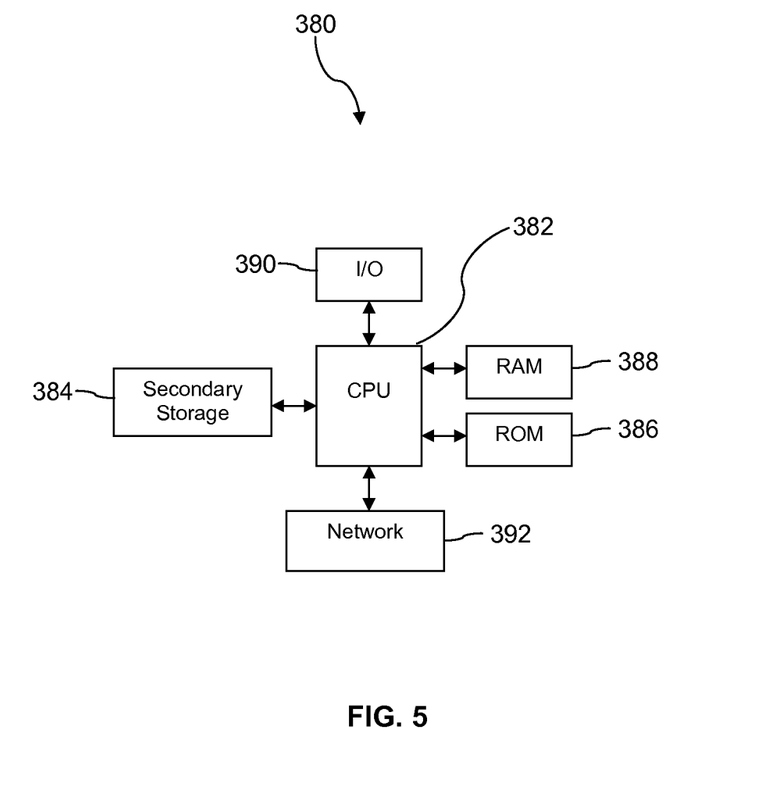
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for creating, by an application executing on a computer, an updated dataset from an existing dataset, the existing dataset comprising a plurality of existing records, each existing record comprising a plurality of fields, at least one field in the plurality of fields being a unique identifier field, the unique identifier field comprising a unique identifier, wherein the existing dataset comprises records of user interactions with mobile communication devices, the method comprising:

adding, by a database management tool executing on a computer, a temporary field to each existing record in a dataset by adding a new column, the temporary field containing a first value defined as a default value for the new column, wherein the database management tool does not provide an application programming interface (API) function for updating individual fields of records, and wherein the database management tool supports fast access to records in a targeted advertising system;

copying a subset of the records in the dataset, by an application executing on a computer;

changing, by the application, at least one individual field in each of the copied subset of records to update the records;

changing, by the application, the temporary field to a second value different from the first value in the copied subset of records;

adding, by the database management tool, the subset of records to the dataset;

aggregating, by the database management tool, the dataset based on a selection criterion defined with reference to the temporary field, wherein aggregating comprises identifying conflicts that comprise records that each have a unique identifier that is the same, identifying a preferred record for each conflict based on the criterion and based on the temporary field values of the conflicting records, and deleting records for each conflict that are not preferred;

deleting, by the database management tool, the temporary field from the records in the dataset, thereby creating an updated dataset; and periodically creating, by the application, an aggregated set of records based on the updated dataset, wherein each time the aggregated set of records is created, the aggregated set of records is saved as a partition of the dataset, each partition being saved for a multiple of a set period of time.

2. The method of claim 1, wherein the second value is a date upon which the aggregating step occurs, and the first value is one day prior to the date upon which the aggregating step occurs.

3. The method of claim 1, wherein the existing dataset and the updated dataset are both partitions of a source dataset.

4. The method of claim 1, wherein the step of aggregating is performed using open source software.

5. The method of claim 1, wherein each unique identifier is assigned by an owner of the dataset.

6. A method for creating, by the application executing on the computer, a series of partitions of a dataset, the dataset comprising an existing partition, the existing partition comprising a plurality of existing records, each existing record comprising a plurality of fields, at least one field in the plurality of fields being a unique identifier field, the unique identifier field comprising a unique identifier, and a temporary field storing a temporal value, the method comprising:

adding, by a database management tool executing on a computer, the temporary field to each existing record in the dataset by adding a new column, the temporary field containing a first value defined as a default value for the new column, wherein the database management tool does not provide an application programming interface (API) function for updating individual fields of records;

copying a subset of the records in the dataset, by an application executing on a computer;

changing, by the application, at least one individual field in each of the copied subset of records to update the records;

changing, by the application, the temporary field to a second value different from the first value in the copied subset of records;

adding, by the database management tool, the subset of records to the dataset;

aggregating, by the database management tool, the dataset based on a selection criterion defined with reference to the temporary field, wherein the aggregating creates a new partition comprising aggregated records, wherein the aggregating comprises identifying conflicts that comprise records that each have a unique identifier that is the same, identifying a preferred record for each conflict based on the criterion and based on the temporary field values of the conflicting records, and deleting records for each conflict that are not preferred;

deleting, by the database management tool, the temporary field from the records in the dataset, thereby creating an updated dataset; and subsequent to creating the updated dataset, periodically creating additional partitions by using the updated dataset that was created.

7. The method of claim 6, wherein the second value is a date upon which the aggregating step occurs, and the first value is one day prior to the date upon which the aggregating step occurs.

8. The method of claim 6, wherein each unique identifier is assigned by an owner of the dataset.

9. The method of claim 6, wherein each partition is destroyed after a subsequent partition is created.

10. The method of claim 6, wherein the new partition is created on a periodic basis, the periodic basis being a set number of days.

11. The method of claim 10, wherein each partition is saved for a period of time, the period of time being longer than the set number of days.

12. A method for creating, by the application executing on a computer, an updated dataset from an existing dataset, the existing dataset comprising a plurality of existing records, each existing record comprising a plurality of fields, at least one field in the plurality of fields being a unique identifier field, and one field in the plurality of fields being a temporal field, the unique identifier field comprising a unique identifier, the method comprising:

copying a subset of the records in the existing dataset, by a database management tool executing on a computer;

changing, by an application executing on a computer, at least one individual field in each of the copied subset of records to update the records;

changing, by the application, the temporal field to a value of a current date and different from an initial value in the copied subset of records;

adding, by the database management tool, the subset of records to the existing dataset;

aggregating, by the database management tool, the existing dataset based on a selection criterion defined with reference to the temporal field that prefers conflicting records having a value of a later date value, wherein aggregating comprises identifying conflicts that comprise records that each have a unique identifier that is the same, identifying a preferred record for each conflict based on the criterion and based on the temporal field values of the conflicting records, and deleting records for each conflict that are not preferred, thereby creating an updated dataset;

after aggregating, changing contents of temporal fields of at least some records in the updated dataset so that all the records in the updated dataset have a same content in temporal fields; and after a set period of time, creating, by the application executing on the computer, a new aggregated set of records by using updated records that have been created since a previous update, wherein each time the new aggregated set of records is created, the new aggregated set of records is saved as a partition of the existing dataset, each partition being saved for a multiple of the set period of time.

13. The method of claim 12, wherein the initial value of the temporal field is the date when the record was last updated.

14. The method of claim 12 wherein the existing dataset and the updated dataset are both partitions of a source dataset.

15. The method of claim 12, wherein each unique identifier is assigned by an owner of the dataset.

\* \* \* \* \*